United States Patent
Zhang

(10) Patent No.: US 10,132,253 B2
(45) Date of Patent: Nov. 20, 2018

(54) CONTROLLING COMBUSTION PROCESSES IN AN INTERNAL COMBUSTION ENGINE

(71) Applicant: Continental Automotive GmbH, Hannover (DE)

(72) Inventor: Hong Zhang, Tegernheim (DE)

(73) Assignee: CONTINENTAL AUTOMOTIVE GMBH, Hannover (DE)

(*) Notice: Subject to any disclaimer, the term of this patent is extended or adjusted under 35 U.S.C. 154(b) by 91 days.

(21) Appl. No.: 15/507,388

(22) PCT Filed: Aug. 10, 2015

(86) PCT No.: PCT/EP2015/068364
§ 371 (c)(1),
(2) Date: Feb. 28, 2017

(87) PCT Pub. No.: WO2016/034372
PCT Pub. Date: Mar. 10, 2016

(65) Prior Publication Data
US 2017/0292461 A1    Oct. 12, 2017

(30) Foreign Application Priority Data
Sep. 3, 2014 (DE) .......... 10 2014 217 560

(51) Int. Cl.
*F02M 59/10* (2006.01)
*F02D 41/00* (2006.01)
(Continued)

(52) U.S. Cl.
CPC ....... *F02D 41/009* (2013.01); *F02D 13/0234* (2013.01); *F02D 41/3809* (2013.01);
(Continued)

(58) Field of Classification Search
CPC ............. F02D 13/0234; F02D 13/0238; F02D 41/009; F02D 41/3287; F02D 2200/0602;
(Continued)

(56) References Cited

U.S. PATENT DOCUMENTS 5,357,932 A    10/1994    Clinton et al. ................ 123/488
7,699,040 B2 *    4/2010    Serra ................... F02D 41/3845
                                                              123/445
(Continued)

FOREIGN PATENT DOCUMENTS

DE    4412020 A1    10/1994    .............. F01L 13/00
DE    10115262 A1    10/2002    ............... F01L 1/34
(Continued)

OTHER PUBLICATIONS

German Office Action, Application No. 102014217560.7, 5 pages, dated Mar. 9, 2015.
International Search Report and Written Opinion, Application No. PCT/EP2015/068364, 17 pages, dated Dec. 22, 2015.

*Primary Examiner* — Erick Solis
(74) *Attorney, Agent, or Firm* — Slayden Grubert Beard PLLC

(57) ABSTRACT

The present disclosure relates to internal combustion engines. The teachings thereof may be embodied in methods and devices for controlling the combustion processes taking place in the cylinders of an internal combustion engine. A method for controlling a combustion process in an internal combustion engine may include: measuring an actual camshaft position; measuring the actual rail pressure; calculating a phase correction value based on the measured actual rail pressure and a mass of fuel to be injected; calculating corrected actual camshaft positions based on the measured actual camshaft position and the respective phase correction value; calculating a mass of air depending on the determined corrected actual camshaft position; and calculating a fuel injection mass based on the mass of air determined for each cylinder.

6 Claims, 2 Drawing Sheets

(51) Int. Cl.
*F02D 41/38* (2006.01)
*F02D 41/40* (2006.01)
*F02D 13/02* (2006.01)

(52) U.S. Cl.
CPC ..... *F02D 41/3827* (2013.01); *F02D 41/3845* (2013.01); *F02D 41/40* (2013.01); *F02M 59/102* (2013.01); *F02D 2200/04* (2013.01); *F02D 2200/0402* (2013.01); *F02D 2200/0406* (2013.01); *F02D 2200/0602* (2013.01); *F02D 2200/0614* (2013.01); *F02D 2200/0616* (2013.01); *Y02T 10/44* (2013.01)

(58) Field of Classification Search
CPC .... F02D 2200/0614; F02D 2200/0616; F02M 59/102
USPC .......................................... 123/447, 456, 508
See application file for complete search history.

(56) References Cited

U.S. PATENT DOCUMENTS

| | | | |
|---|---|---|---|
| 8,315,780 B2 * | 11/2012 | Toyohara | ............ F02M 59/367 123/456 |
| 2005/0103311 A1 * | 5/2005 | Adachi | ............... F02D 41/3836 123/456 |
| 2009/0139489 A1 * | 6/2009 | Serra | ................... F02D 41/3854 123/456 |

FOREIGN PATENT DOCUMENTS

| | | | | |
|---|---|---|---|---|
| DE | 10341583 A1 | 4/2005 | ............. | F01L 1/344 |
| DE | 102005057974 A1 | 6/2007 | ............. | F02D 41/00 |
| JP | 2013076362 A | 4/2013 | ............. | F02D 41/14 |
| WO | 2016/034372 A1 | 3/1916 | ............. | F02D 41/00 |

* cited by examiner

CONTROLLING COMBUSTION PROCESSES IN AN INTERNAL COMBUSTION ENGINE

CROSS-REFERENCE TO RELATED APPLICATIONS

This application is a U.S. National Stage Application of International Application No. PCT/EP2015/068364 filed Aug. 10, 2015, which designates the United States of America, and claims priority to DE Application No. 10 2014 217 560.7 filed Sep. 3, 2014, the contents of which are hereby incorporated by reference in their entirety.

TECHNICAL FIELD

The present disclosure relates to internal combustion engines. The teachings thereof may be embodied in methods and devices for controlling the combustion processes taking place in the cylinders of an internal combustion engine.

BACKGROUND

Fuel injection systems have a plurality of cylinders, in each of which a fuel-air mixture is introduced and ignited. These cylinders have inlet and outlet valves which engage with cams provided on an inlet valve camshaft or an outlet valve camshaft, their opening and closing times being set by a control unit in dependence on the camshaft position signal provided by a camshaft sensor.

To determine the mass of air required in each case for the fuel-air mixture, it is typical to use the camshaft position signal provided by the camshaft sensor as an actual position signal for all of the cylinders of the fuel injection system. Furthermore, a setpoint phase shift of the inlet valve camshaft is calculated on the basis of the setpoint air mass and the engine speed. The phase shift is then controlled using the camshaft position signal and the setpoint phase shift.

A method for controlling the quantity of air and/or the fuel-air ratio for individual cylinders of an internal combustion engine is disclosed in DE 10 2005 057 974 A1. In that document, the amplitude and frequency of a signal, which is not cylinder-specific and is influenced by an actuator which is not cylinder-specific, is determined and is used to identify cylinder-specific signal components, and the cylinder-specific signal components are used as the basis for actuating the actuator, which is not cylinder-specific.

Furthermore, it is already known to drive the high-pressure pump of a fuel injection system using the cams of a camshaft. In such a fuel injection system, if the pressure in the rail and/or the delivery volume of the high-pressure pump increases, then the torque to be provided therefor by the camshaft also increases. This amended torque causes further torsion of the camshaft. In turn, this leads to undesired deviation in the control times of the inlet valves, which is greater the greater the distance of the respective cam from the camshaft sensor. The undesired deviation in the control times in turn affects the quantity of air with which the respective cylinder is filled, and thus also the associated quantity of fuel.

SUMMARY

The teachings of the present disclosure may be embodied in methods and devices for improving the combustion processes taking place in the cylinders of an internal combustion engine, which reduce the undesired influences of pressure changes in the rail and/or of a change in the delivery volume of the high-pressure pump of the internal combustion engine, on the combustion processes taking place in the cylinders.

Some embodiments may include a method for improving the combustion processes taking place in the cylinders of an internal combustion engine having a camshaft, a high-pressure pump driven by the camshaft, a rail and a control unit. The method may include the following steps: measuring the actual camshaft position using a camshaft sensor, measuring the actual rail pressure using a rail pressure sensor, determining, for each cylinder, a phase correction value in dependence on the measured actual rail pressure and the mass of fuel to be injected, determining, for each cylinder, corrected actual camshaft positions by evaluating the measured actual camshaft position and the respective phase correction value, determining, for each cylinder, a mass of air in dependence on the determined corrected actual camshaft position, and determining, for each cylinder, a fuel injection mass in dependence on the mass of air determined for each cylinder.

Some embodiments may include: measuring the actual intake pipe pressure using a pressure sensor arranged in the intake pipe of the internal combustion engine, determining, for each cylinder, the opening times and/or closing times of the inlet valves of the cylinders by evaluating the measured actual intake pipe pressure, and adapting the actual camshaft positions corrected on a cylinder-specific basis, and thus also the air masses determined for each cylinder, using the opening times and/or closing times of the inlet valves, determined for each cylinder.

Some embodiments may include: measuring the actual pressure in the cylinders using a pressure sensor arranged in the respective cylinder, determining, for each cylinder, the opening times and/or closing times of the inlet valves of the cylinders by evaluating the measured actual pressure in the cylinders, and adapting the actual camshaft positions corrected on a cylinder-specific basis, and thus also the air masses determined for each cylinder, using the opening times and/or closing times of the inlet valves, determined for each cylinder.

Some embodiments may include a device for improving the combustion processes taking place in the cylinders of an internal combustion engine. The device may include: a camshaft, a high-pressure pump driven by the camshaft, a rail and a control unit. The control unit (10) may perform: receiving output signals from a camshaft sensor, describing the actual camshaft position, receiving the output signals from a rail pressure sensor, describing the actual rail pressure, determining, for each cylinder, a phase correction value in dependence on the measured actual rail pressure and the mass of fuel to be injected, determining, for each cylinder, corrected actual camshaft positions by evaluating the measured actual camshaft position and the respective phase correction value, determining, for each cylinder, a mass of air in dependence on the determined corrected actual camshaft position, and determining, for each cylinder, a fuel injection mass in dependence on the mass of air determined for each cylinder.

In some embodiments, the control unit (10) is designed to carry out the following further steps: receiving the output signals, describing the actual intake pipe pressure, of a pressure sensor arranged in the intake pipe of the internal combustion engine, determining, for each cylinder, the opening times and/or closing times of the inlet valves of the cylinders by evaluating the measured actual intake pipe pressure, and adapting the actual camshaft positions corrected on a cylinder-specific basis, and thus also the air masses determined for each cylinder, using the opening times and/or closing times of the inlet valves, determined for each cylinder.

In some embodiments, the control unit (10) is designed to carry out the following further steps: receiving the output signals, describing the actual pressure in the cylinders, of the pressure sensors arranged in the cylinders, determining, for each cylinder, the opening times and/or closing times of the inlet valves of the cylinders by evaluating the measured actual pressure in the cylinders, and adapting the actual camshaft positions corrected on a cylinder-specific basis, and thus also the air masses determined for each cylinder, using the opening times and/or closing times of the inlet valves, determined for each cylinder.

BRIEF DESCRIPTION OF THE DRAWINGS

There follows a description of an exemplary embodiment with reference to the figures, in which.

DETAILED DESCRIPTION

In spite of using just one camshaft sensor, the undesired influences, of torsion of the camshaft by means of pressure changes in the rail and/or of a change in the delivery volume of the high-pressure pump, on the combustion processes in the cylinders may be reduced using the teachings of the present disclosure. Methods may include determining, for each cylinder, the mass of air and of fuel, it being ensured that, for each cylinder, a predefined fuel-air ratio is maintained and the number of pollutant particles contained in the exhaust gas being reduced.

Some methods include determining, for each cylinder, a phase correction value in dependence on the actual rail pressure and the quantity of fuel to be injected, determining, for each cylinder, corrected actual camshaft positions by evaluating the measured camshaft position and the respective phase correction value, determining, for each cylinder, a mass of air in dependence on the determined corrected actual camshaft position, and determining, for each cylinder, a fuel injection mass in dependence on the mass of air determined for each cylinder.

In some embodiments, the corrected actual camshaft positions, and thus also the determined cylinder-specific air mass, are adapted using the output signal from a pressure sensor which is arranged either in the intake pipe or in the respective cylinder and provides information relating to the actual pressure in the intake pipe or in the respective cylinder.

Figure 1:
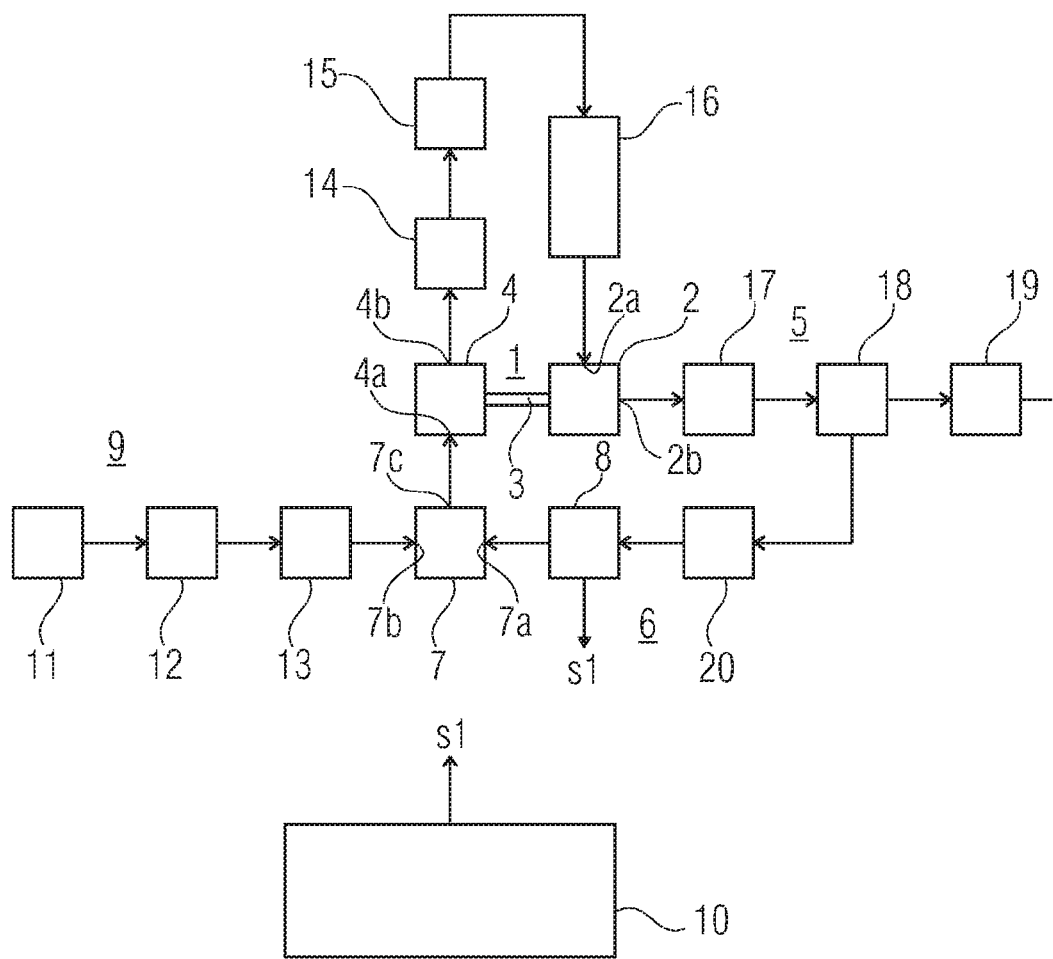
FIG. 1 is a block diagram of a device for improving the combustion processes taking place in the cylinders of an internal combustion engine according to the teachings of the present disclosure.

FIG. 1 shows a block diagram of a device for improving the combustion processes taking place in the cylinders of an internal combustion engine. The device shown in FIG. 1 has a fresh air inlet duct 9 in which are contained a fresh air inlet 11, an air purification device 12, and an inlet flap 13.

The device shown also has an exhaust gas duct 5 connected to the outlet 2b of the turbine 2 of an exhaust-gas turbocharger 1. The exhaust gas duct 5 contains a catalytic converter 17, a branching point 18 and a silencer 19. An exhaust gas recirculation duct 6 branches off at the branching point 18. This duct 6 has an exhaust gas cooler 20 and an exhaust gas recirculation valve 8.

The outlet of the exhaust gas recirculation valve 8 is connected to a first inlet 7a of a mixer 7. The outlet of the inlet flap 13 of the fresh air inlet duct 9 is connected to the second inlet 7b of the mixer 7. The outlet 7c of the mixer 7 is connected to the inlet 4a of a compressor 4 of the exhaust-gas turbocharger. The compressor 4 has a compressor rotor which is secured in rotation with a shaft 3 which is also secured in rotation with a turbine rotor of the turbine 2.

The exhaust gases of an internal combustion engine 16 are supplied, in the form of an exhaust gas stream, to the inlet 2a of the turbine. This exhaust gas stream drives the turbine rotor. This also rotates the shaft 3 of the exhaust-gas turbocharger 1. This rotation of the shaft is transmitted to the compressor rotor. The compressor draws in and compresses the fresh air/exhaust gas mixture that is created in the mixer 7 and is supplied to the inlet 4a of the compressor. The compressed fresh air/exhaust gas mixture is expelled at the outlet 4b of the compressor and is supplied, via a charge air cooler 14 and a throttle flap 15, to the internal combustion engine 16. As already explained above, the exhaust gas created in the internal combustion engine is expelled at the inlet 2a of the turbine 2.

The device shown in FIG. 1 also has a control unit 10 which contains a processing unit and multiple memory units in which tables and characteristic diagrams are stored. The output signals from a multiplicity of sensors, which supply the control unit with actual values of a multiplicity of parameters, are supplied to the control unit 10 as input signals. These include, inter alia, a sensor which detects actuation of the accelerator pedal. The output signals from this sensor tell the control unit 10 that there is a desire for acceleration. The device includes a sensor which provides the control unit 10 with information relating to the actual intake pipe pressure. This sensor is provided between the throttle flap 15 and the internal combustion engine 16. Additional sensors provide information relating to the actual pressure in the cylinders of the internal combustion engine 16.

The control unit 10 evaluates the output signals from the sensors, the saved tables and the saved characteristic diagrams to calculate control signals which are used to actuate components of the device shown. Inter alia, the control unit 10 calculates control signals s1 for the exhaust gas recirculation valve 8 and transmits these thereto. These control signals s1 cause the opening state of the exhaust gas recirculation valve 8 to change, depending on the immediate requirement, in order to supply more or less exhaust gas to the mixer 7.

Furthermore, the control unit 10 determines the air mass of the internal combustion engine 16 on an individual cylinder basis, and uses the air mass determined for each cylinder in order to determine a respective associated fuel injection mass. This is explained in greater detail below with reference to FIG. 2, which shows a more detailed illustration of parts of the device shown in FIG. 1.

Figure 2:
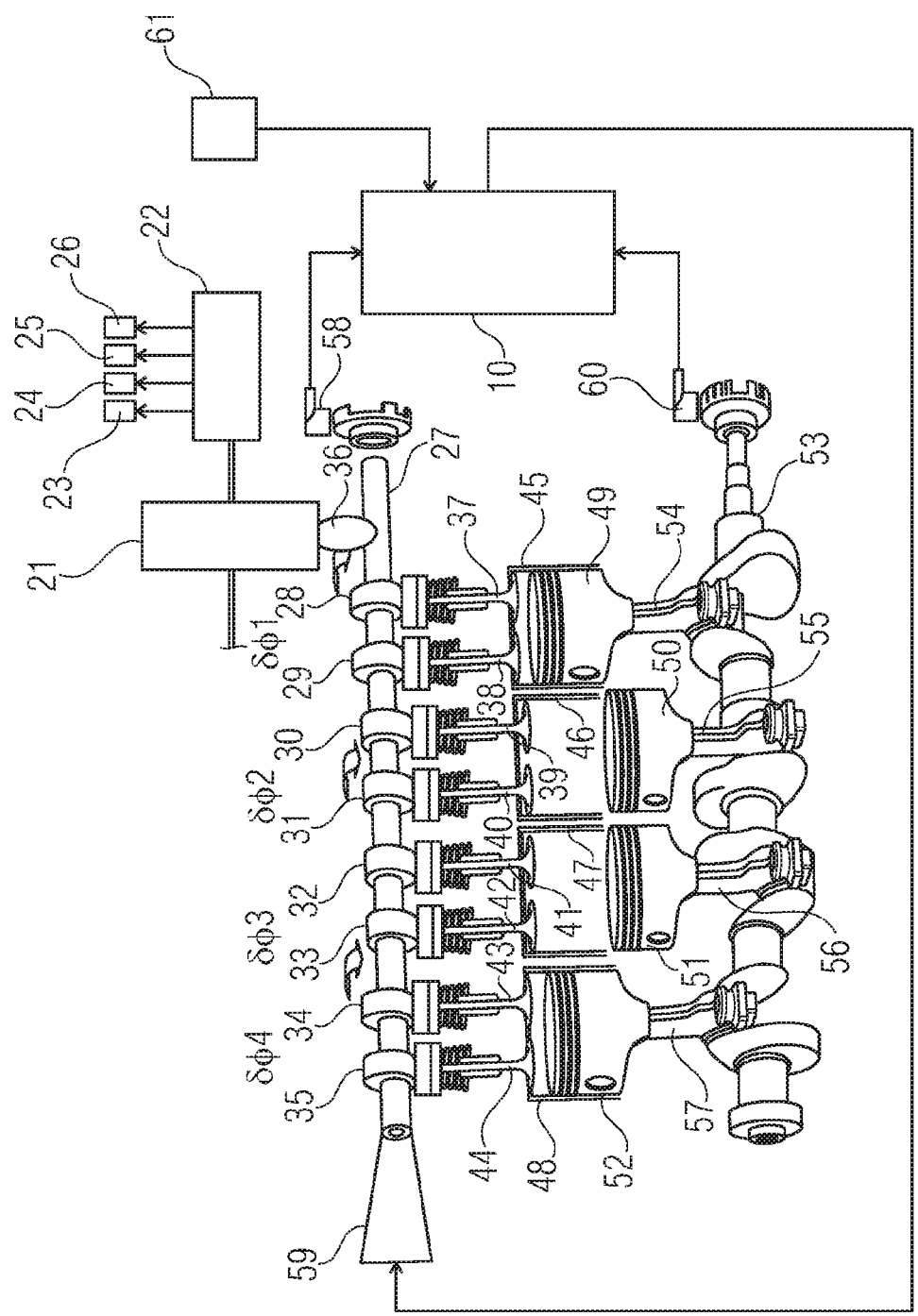
FIG. 2 is a more detailed illustration of parts of the device shown in FIG. 1.

These include a high-pressure pump 21, a rail 22 connected to fuel injectors 23, 24, 25 and 26, a camshaft 27 that bears cams 28-36, inlet valves 37-44, a total of four cylinders 45-48 in each of which a piston 49-52 can be moved up and down, and a crankshaft 53 that is connected to the pistons by connecting rods 54-57. In addition, FIG. 2 shows the control unit 10, already shown in FIG. 1, and a camshaft sensor 58, a camshaft adjuster 59, a crankshaft sensor 60 and sensors 61 whose output signals are supplied to the control unit 10. These sensors include, inter alia, a rail pressure sensor, an intake pipe pressure sensor and pressure sensors arranged in the cylinders.

The high-pressure pump 21 may be engaged to raise the pressure of the supplied fuel, and to forward the high-pressure fuel to the rail 22. From the rail 22, the fuel is supplied to the injectors 23, 24, 25, 26 which each inject the fuel into one of the cylinders 45-48. In that context, the control unit 10 controls the quantity of fuel and the injection times in a known manner. The high-pressure pump 21 is driven, via the cams 36, by the rotating camshaft 27. An increase in the pressure of the fuel in the rail and/or in the delivery volume of the high-pressure pump 21 causes further torsion of the camshaft.

This gives rise to a cylinder-specific offset of the camshaft position with respect to the actual camshaft position measured using the camshaft sensor 58. The further removed the respective cylinder is from the high-pressure pump 21 or from the cams 36 driving the high-pressure pump 21, the greater this offset. Furthermore, this offset also increases with increasing rail pressure and with increasing fuel volume to be delivered by the high-pressure pump 21.

This offset—which differs from cylinder to cylinder—causes the air mass, introduced into the respective cylinders via the respective associated inlet valves, to deviate from the setpoint air mass predefined by the control unit 10, and as a result the fuel-air ratio introduced into the respective cylinders deviates from the respective predefined fuel-air ratio that is optimized for the combustion process. This leads to undesired deterioration of the combustion processes taking place in the cylinders, and an increased number of pollutant particles contained in the exhaust gas.

To avoid these drawbacks, cylinder-specific phase correction values $\delta 01, \delta 02, \delta 03$ and $\delta 04$ are determined. These are determined in dependence on the actual rail pressure which is measured by the rail pressure sensor, and on the quantity of fuel to be injected, predetermined by the control unit 10, for example by using a characteristic diagram. For each individual cylinder, the determined phase correction values are added by the control unit 10 to the actual camshaft position measured by the camshaft sensor 58. The cylinder-specific corrected actual camshaft positions, determined by this adding step, are used by the control unit 10 to determine, for each cylinder, the air mass for the respective cylinder.

The air mass determined for each cylinder is then used to determine, for each cylinder, a respective associated fuel injection mass. In order to further improve the cylinder-specific determining of the air mass, the camshaft positions corrected on a cylinder-specific basis are adapted or optimized by measuring the inlet valve closing times and/or the inlet valve opening times using the output signals from an intake pipe pressure sensor provided in the intake pipe, or using the output signals from cylinder pressure sensors provided in the cylinders. This determines a further correction value for each individual cylinder, which value, together with the phase correction values $\delta 01, \delta 02, \delta 03, \delta 04$ already mentioned above and the actual camshaft position information provided by the camshaft sensor 58, is used to determine a further improved value for the cylinder-specific air masses, which are in turn used to determine a corresponding associated optimized fuel injection mass.

The above-described approach provides, on a cylinder-specific basis, a predefined, desired fuel-air ratio to underpin the combustion processes in the cylinders, and therefore the number of pollutant particles contained in the exhaust gas may be minimized.

What is claimed is:

1. A method for controlling a combustion process in an internal combustion engine having a camshaft, a high-pressure pump driven by the camshaft, a rail, and a control unit, having the following steps:
   measuring the actual camshaft position using a camshaft sensor;
   measuring the actual rail pressure using a rail pressure sensor;
   calculating, for each cylinder, a phase correction value based on the measured actual rail pressure and a mass of fuel to be injected;
   calculating, for each cylinder, corrected actual camshaft positions based on the measured actual camshaft position and the respective phase correction value;
   calculating, for each cylinder, a mass of air based on the determined corrected actual camshaft position; and
   calculating, for each cylinder, a fuel injection mass based on the mass of air determined for each cylinder.

2. The method as claimed in claim 1, further comprising:
   measuring the actual intake pipe pressure using a pressure sensor arranged in the intake pipe of the internal combustion engine;
   calculating, for each cylinder, opening times or closing times of the inlet valves of the cylinders based on the measured actual intake pipe pressure, and
   adapting actual camshaft positions corrected on a cylinder-specific basis and the air masses determined for each cylinder, using the opening times and/or closing times of the inlet valves determined for each cylinder.

3. The method as claimed in claim 1, further comprising:
   measuring an actual pressure in each cylinder using a pressure sensor arranged in the respective cylinder;
   calculating, for each cylinder, opening times and/or closing times of the inlet valves of the cylinders based on the measured actual pressure in the cylinders; and
   adapting actual camshaft positions corrected on a cylinder-specific basis and the air masses determined for each cylinder, using the opening times and/or closing times of the inlet valves determined for each cylinder.

4. A system for controlling combustion processes in an internal combustion engine, the system comprising:
   a camshaft;
   a high-pressure pump driven by the camshaft;
   a rail; and
   a control unit
   to carry out the following steps:
   receive output signals from a camshaft sensor representing an actual camshaft position;
   receive output signals from a rail pressure sensor representing the actual rail pressure;
   determining, for each cylinder, a phase correction value based on the measured actual rail pressure and a mass of fuel to be injected;
   determining, for each cylinder, corrected actual camshaft positions based on the measured actual camshaft position and the respective phase correction value;
   determining, for each cylinder, a mass of air based on the determined corrected actual camshaft position; and
   determining, for each cylinder, a fuel injection mass based on the mass of air determined for each cylinder.

5. The system as claimed in claim 4, wherein the control unit carries out the following further steps:
   receive the output signals representing the actual intake pipe pressure from a pressure sensor arranged in the intake pipe of the internal combustion engine;

determine, for each cylinder, opening times and/or closing times of the inlet valves of the cylinders by evaluating the measured actual intake pipe pressure; and adapt the actual camshaft positions corrected on a cylinder-specific basis and the air masses determined for each cylinder using the opening times and/or closing times of the inlet valves determined for each cylinder.

6. The system as claimed in claim 4, wherein the control unit carries out the following further steps:

receive output signals representing an actual pressure in the cylinders from pressure sensors arranged in the cylinders; determine, for each cylinder, opening times and/or closing times of the inlet valves of the cylinders by evaluating the measured actual pressure in the cylinders; and adapt the actual camshaft positions corrected on a cylinder-specific basis and thus the air masses determined for each cylinder, using the opening times and/or closing times of the inlet valves determined for each cylinder.

\* \* \* \* \*